United States Patent Office 3,071,063
Patented Jan. 1, 1963

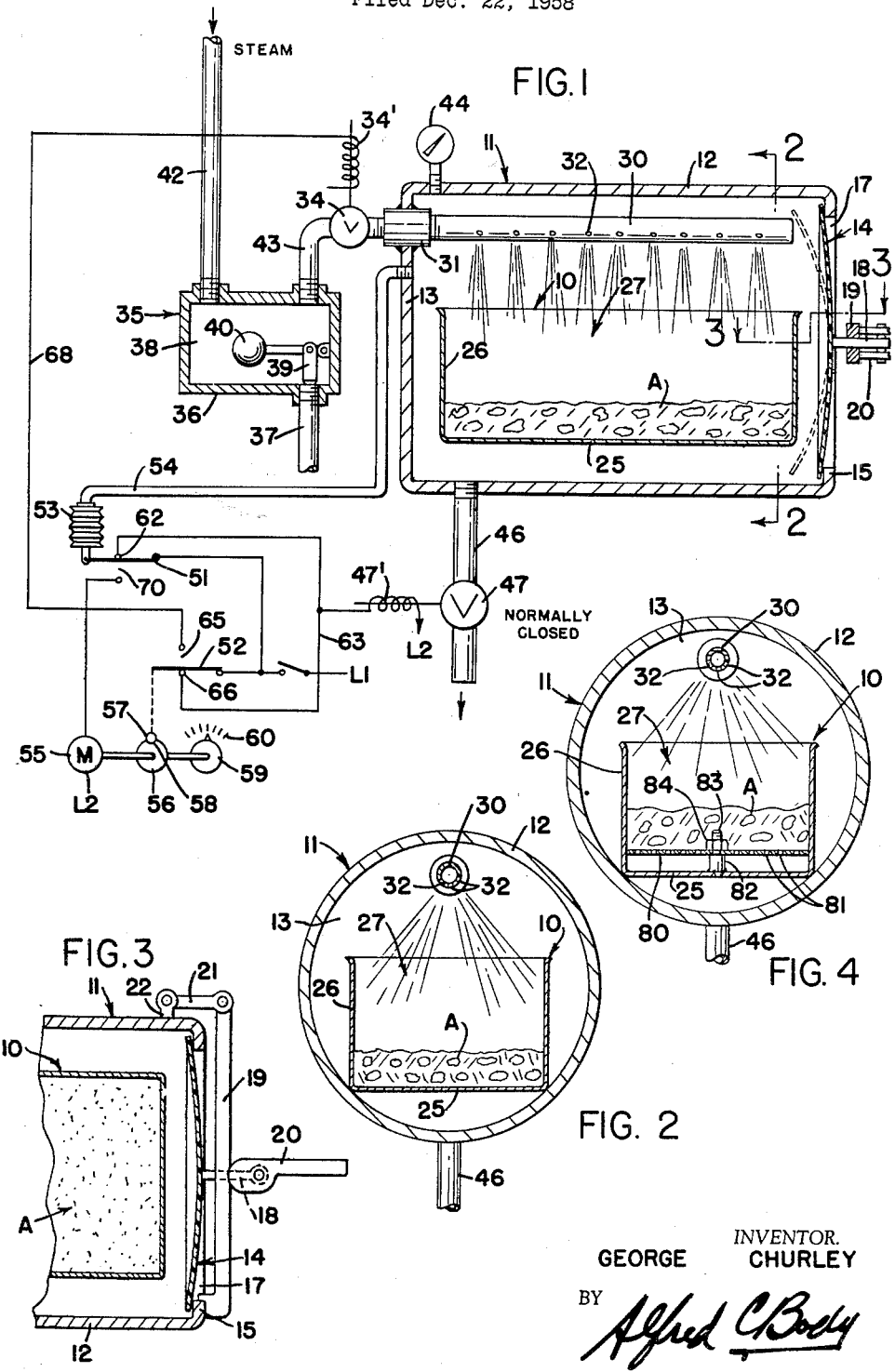
Jan. 1, 1963 — G. CHURLEY — 3,071,063
STEAM PRESSURE COOKER
Filed Dec. 22, 1958
INVENTOR.
GEORGE CHURLEY
BY Alfred C Body
ATTORNEY

3,071,063
STEAM PRESSURE COOKER
George Churley, Willoughby, Ohio, assignor to The Stouffer Corporation, a corporation of Ohio
Filed Dec. 22, 1958, Ser. No. 782,303
13 Claims. (Cl. 99—332)

This invention pertains to the art of cooking, and more particularly to a high speed cooker using externally supplied steam as the source of heat.

The invention is particularly applicable to the high speed cooking of frozen vegetables for service in restaurants and the like, and will be described with particular reference thereto although it will be appreciated that the invention has broader applications.

In the art of cooking for restaurants, the quality of the cooking is probably the most important item to a continuing customer acceptance and repeat business. Such quality cooking requires that the food be thoroughly cooked, but never over-cooked.

Next to quality, speed of cooking becomes most important. Thus, as the speed of cooking is increased, the same equipment and the same space can serve more and more people with the resultant savings in the cost of the food to the customer and increased profits to the proprietor.

In the cooking of vegetables, it is known to employ steam under pressure as the source of heat. Such steam under pressure cooks the vegetables at greatly increased speeds over boiling water, but as will appear, unless the steam is properly applied, very fast cooking speeds still cannot be obtained. This problem is particularly apparent with the frozen vegetables now conventionally employed in restaurants. As attempts were made to increase the cooking speed using steam, the problem of over-cooking part of the vegetables of a batch and under-cooking others became serious. Thus, in some instances it was found that some of the vegetables in the cooker were either completely or even over-cooked, while others were either still frozen or completely raw.

The present invention contemplates new and improved methods of cooking and apparatus for cooking of a general type referred to which overcomes all of the above-referred to difficulties and enables cooking speeds faster than anything heretofore possible while still ensuring that the entire batch of food will be cooked to substantially the same degree of thoroughness.

In accordance with the present invention, the food to be cooked is placed in an open top container positioned inside of a closed pressure vessel, and steam under pressure is projected in jets directly onto the top of the food in the container and is allowed to project onto such food until it is thoroughly cooked.

By following what would appear at first glance to be such a simple expedient, it has been possible to decrease the cooking time for frozen vegetables by almost 50% from anything heretofore known in the restaurant cooking business, and at the same time the problems of over and under cooking of the vegetables are entirely eliminated.

The above may be distinguished from prior practices wherein steam was simply allowed to project into the pressure vessel in a manner such that no direct jet of steam directly contacted the upper surface of the food in the container.

The food may be placed in perforated or imperforated open-topped containers, but in accordance with a more limited aspect of the invention, an imperforated open-topped container is employed and the steam, just before being projected onto the top of the food, is passed through a water and a dirt trap whereby only dry clean steam reaches the food.

In the preferred embodiment of this invention the food is supported on a perforated tray above the imperforate container bottom, so that the condensate and food juices can readily drain down through the tray and away from the food being cooked. This improves the speed and uniformity of cooking certain vegetables.

By using an imperforate container, the natural juices of the foods are retained, making it unnecessary for the chef to add liquids to the cooked food after it has been cooked, as would be necessary with a perforated container. The use of the water and dirt trap prevents these juices from being diluted by the slug of water normally present in a steam pressure line having only an occasional steam flow, such as would be present in lines leading to steam pressure cookers. Furthermore, such condensate has a tendency to have suspended therein small particles of dirt which, particularly in an imperforate container, would remain on the vegetables and make them unpalatable.

The principal object of the invention is the provision of a new and improved method and apparatus for the cooking of foods in restaurants and the like which permits of extremely high cooking speeds.

Another object of the invention is the provision of a new and improved method and apparatus wherein all of the food can be rapidly cooked without the dangers of over and under-cooking.

Another object of the invention is the provision of a new and improved method and apparatus for the cooking of frozen vegetables wherein the juices of the cooked vegetables are retained.

Still another object of the invention is the provision of a new and improved method of high speed cooking of frozen vegetables and the like which can be completely automatic.

Still another object of the invention is the provision of a new and improved method and apparatus for the cooking of vegetables for restaurants and the like which enables a single cooking unit to handle a maximum number of servings in a given period of time.

The invention may take physical form in certain parts and arrangements of parts, preferred embodiments of which will be described in detail in this specification and illustrated in the accompanying drawing which is a part hereof and wherein:

FIGURE 1 is a side cross-sectional view, partly schematic, of a steam pressure cooker illustrating a preferred embodiment of the invention;

FIGURE 2 is a cross-sectional view of FIGURE 1 taken approximately on the line 2—2 thereof;

FIGURE 3 is a fragmentary cross-sectional view of FIGURE 1 taken approximately on the line 3—3 thereof; and FIGURE 4 is a view similar to FIGURE 2 and showing an alternative arrangement in which a perforated tray supports the food above the imperforate container bottom.

Referring first to FIGURES 1-3 wherein the showings are for the purposes of illustrating a basic embodiment of the invention only, and not for the purposes of limiting same, the figures show a quantity of food A to be cooked, resting in an open-topped container 10 and positioned on the inside of a closed pressure vessel 11.

The pressure vessel may take any desired form but in the embodiment shown is generally in the shape of a cylinder having cylindrical sidewalls 12 closed at one end by an end 13 and at the opposite end by a door 14 cooperating with an inwardly extending flange 15 on the sidewalls 12. The door 14 is resilient and in the unbiased state is bowed about a horizontal axis, as indicated by the dotted lines 16. Its outer vertical diameter, when flexed to this shape, is less than the inner diameter of the flange 15 so that the door by a sideward motion may be moved outwardly through the opening 17.

The door 14 is flexed to the flat position so that its outer edges bear against the inner surfaces of the flange 15 by means of a toggle arrangement comprised of a toggle handle 20 pivotally connected to an operating shaft 18 reciprocally supported in an arm 19 extending across the opening 17 and pivotally supported on a short pivot arm 21, which in turn is pivotally supported on the outer side of the cylindrical sidewall 12 by a bracket 22. The shaft 18 is connected to the door 14 and operation of the handle 20 tends to move the door from the flexed position shown in dotted lines in FIGURE 1 to the sealing position shown in full lines with the door in pressure sealing engagement with the inner edges of the flange 15. The construction is such that once pressure has been built up on the inside of the vessel 11, the door 14 will remain in sealing engagement with the flange 15 even after the toggle arrangement is released.

The food container 10 may have any desired construction, but in the embodiment under discussion is formed of stainless steel having a bottom 25 and sidewalls 26 defining an open-topped space 27 in which the food A is positioned. The upper edges of the sidewalls 26 are preferably spaced slightly from the inner surfaces of the sidewalls 12 to allow for the passage of steam around the sides of the container 10.

For the purpose of heating the food A in the container 10, a steam ejector pipe 30 extends generally the entire length of the pressure vessel 11 along its vertical midplane high enough so as to provide clearance for insertion and removal of the food container 10. The steam ejector pipe 30 is provided with a plurality of steam ejector passages 32 so formed as to direct jets of steam onto the entire surface of the food A in the container 10. Any number of these jet passages 32 may be employed, but as shown, there are three rows, a center row directed vertically downward and the outer rows directed generally at an angle outwardly and downwardly from the center plane.

Steam is supplied through the steam ejector pipe 30 from a suitable source of steam under pressure (not shown) through a valve 34 and a steam trap 35.

The steam trap 35 is conventional in construction and is comprised of a closed container 36 having a drain line 37 which communicates with the interior 38 through a normally closed valve 39 opened by means of a pivotally supported float 40 when sufficient amounts of condensate have collected in the interior 38. Normally such valve 39 will be closed.

The steam from the steam source enters the trap 35 through a suitable pipe 42 and leaves the trap 35 through a pipe 43, which communicates with the upper end of the trap interior 38 and leads directly to the steam ejector pipe 30 through the valve 34.

The valve is preferably located on the vessel side of the trap, although it may be located on either side thereof. It is important that any horizontal portion of the pipe 43 which communicates the trap with the steam ejector pipe 30 have as short a length as possible so that a minimum of condensate can form therein and provision should be made so that any condensate on the pressure side of the valve 34 can drain back into the trap interior 38.

Drainage means is provided for the pressure vessel 11 consisting of a pipe 46 communicating with the interior of the pressure vessel 11 preferably at the lowest point, as shown, and a valve 47 controls the flow of air, gas and/or water through this drain pipe 46.

A pressure gage 44 indicates the pressure on the interior of the vessel 11.

In this embodiment, means are provided for automatically opening and closing the valves 34, 47 in the proper sequence and leaving them open or closed for the proper time period so that the cooking operation may progress on a substantially automatic basis.

In the preferred embodiment, the valves 34, 47 are normally closed solenoid valves of a conventional type having operating coils shown schematically at 34', 47' respectively, one terminal of each of which is connected to a common power line L2. The other terminals of the coils 34', 47' are energized through a pair of single pole, double throw switches 51, 52.

The switch 51 is a pressure operated switch and has a pressure actuated bellows 53 communicating with the interior of the pressure vessel 11 through a conduit 54. The other switch 52 is actuated by means of a timer of conventional construction, including a motor 55 which rotates a cam 56 operatively associated with a cam follower 57. The cam 56 is shown in the off position and the follower 57 is resting in a notch 58 formed in the cam surface. A dial knob 59 in association with a graduated scale 60 rotates the cam 56 and enables the timer to be set for any desired period of operation.

Prior to the beginning of operation of the apparatus disclosed, the coil 47' is energized from the line L1 through the normally closed contacts 62 and 66 of switch 51 and switch 52 respectively. Thus, the valve 47 is open.

When an operator desires to start a cooking operation, the food A, usually loose and frozen, is placed in the container 10. This container is then placed in the pressure vessel 11 and the door 14 closed and brought into sealing engagement with the flange 15 by operation of the handle 20. To start the cooking operation, the operator then sets the dial 59 to the desired time period on the scale 60. This time period may be as desired, but is normally predetermined for each type of food to be placed in the container 10. Actuation of the dial 59 rotates the cam 56 and closes the normally open contact 65 of the switch 52. This operation also opens the normally closed contacts 66 without effect because of the normally closed contacts 62 which are in parallel therewith. Closing of the contacts 65 energizes the coil 34' through wire 68, thus opening valve 34. Steam immediately flows through the trap 35 and through the steam ejector pipe 30 and the steam ejector openings 32 into the pressure vessel 11. The jets of steam strike the food A directly, where the steam gives up its heat to the food and is rapidly condensed. The temperature of the food is raised rapidly to the temperature of the steam. As the top layer of the food becomes heated, the jets of steam are no longer condensed by such top layer and penetrate into intermediate layers of the food where the steam is condensed with the same result. As these intermediate layers are heated to the elevated temperatures, the steam continues to project through the spaces between the particles of food to the lowermost levels and these lowermost levels are raised to the elevated temperatures. It is to be noted that in this operation, the steam jets tend to drive out the air in the spaces between the food. Such air, along with the air in the remainder in the pressure vessel, is then carried outwardly through the discharge pipe 46 and the valve 47 which, as previously indicated, is open.

As soon as all the food is brought to an elevated temperature and the steam stops condensing thereon at a very rapid rate, the pressure on the interior of the vessel 11 begins to increase. In this respect, it is to be noted that the size of the discharge pipe 46, the opening in the valve 47, or both, form an orifice having an area in relation to the rate of steam supply such that the pressure on the interior of the vessel 11 will not appreciably increase until the rapid rate of steam condensation brought on by the presence of the frozen food particles ceases. Once the food is thawed, the rate of condensation goes down. More steam passes out through the pipe 46. The pressure then rises. As this pressure reaches a predetermined value, normally about 5 pounds per square inch, the bellows 53 are expanded to open contacts 62 and close contacts 70 of the switch 51. Opening of the contacts 62 de-energizes the coil 47' and valve 47 closes while valve 34 remains open. The interior of the vessel 11 thus rises to the full steam line pressure which in the preferred embodiment is 15 pounds per square inch. The operator may then release the handle 20. The door 14 remains closed due to this interior pressure.

The food A then continues to cook at a very rapid rate, the steam being in close contact with all the particles.

Closing of the normally open contacts 70 energizes the motor 55 of the timer which motor then rotates the cam 56 for the period of time set by the dial knob 59.

As soon as the notch 58 comes opposite to the cam follower 57, the switch 52 opens its contacts 65. This de-energizes coil 34' and valve 34 is closed to stop the flow of steam into the vessel 11. Simultaneously, contacts 66 close to energize coil 47' and the valve 47 is opened and the pressure on the inside of the vessel 11 is reduced to atmospheric pressure. As soon as the pressure reaches atmospheric pressure, the door 14 snaps inwardly and the operator knows that the food A is cooked and ready for serving.

With the above operation, it is to be noted that only dry steam is allowed to enter the vessel 11. By virtue of the steam trap 35 and the very short horizontal length of the pipe 43, practically no condensate enters the vessel 11. Some condensate does form on the food A as the steam strikes it and brings the food to the elevated temperature. This condensate in conjunction with the juices of the food A has been found to be just sufficient for the proper serving of the food.

This is to be distinguished from prior practices wherein the food was cooked in a perforated container. Such food had to be removed from the container, placed in another dish and then liquids had to be added.

Such practice is also to be distinguished from prior experiments using an imperforate container and no steam trap where efforts were made to project the steam directly on top of the food A and the amount of condensate which entered was excessive to the point where the natural juices of the food were unnecessarily diluted.

So far as I am aware, it has never heretofore been possible to successfully project steam directly onto the top of food while it is cooking and still obtain a satisfactory cooked product. On the other hand, the present invention has enabled the provision of a high speed pressure cooker which is extremely rapid and at such rapid rate insures that the food will be fully cooked from top to bottom, but not over-cooked at any one point. Furthermore, it enables the retention of all of the natural juices of the food without unnecessary dilution thereof nor contamination.

While the just-described basic method and apparatus of mine has been found to be quite effective and constitutes a substantial improvement over previous apparatus and methods for the same purpose, some practical difficulties are encountered in using it to cook certain types of foods. Certain vegetables, such as lima beans and carrots, require an excessive long time to cook. With such vegetables supported as shown in FIGURES 1-3, their cooking juices remain with the solid vegetables and this increases the required cooking time. One possible explanation for this behaviour is that these juices tend to foam up and impede the penetration of the steam down through to the lower layers of the vegetables being cooked.

The embodiment shown in FIGURE 4 constitutes an improvement in my basic method and apparatus which completely eliminates these difficulties. In this embodiment a perforated tray is provided in the container which supports the food spaced above the container bottom. As the food is being cooked its juices drain down through the perforations in the tray into the container bottom. This arrangement results in a quicker overall cooking time, particularly for such vegetables as carrots and lima beans. At the same time, the juices are retained in the container and they need not be replaced by artificial means when the food is ready to be served.

In this embodiment, referring to FIGURE 4, there is provided a flat tray 80, having a plurality of perforations 81 therein, which supports the food A. The tray 80 is spaced above the bottom 25 of the container 10 in any suitable manner, for example, by means of a shouldered stud 82 which extends up from the container bottom. This stud has an externally threaded, reduced upper end 83 which extends up through a central opening in the tray 80. A nut 84 is threaded onto this upper end of the stud and engages the top of the tray 80 to clamp the latter in place. This particular arrangement is illustrative only. Any other suitable arrangement may be employed to position the tray in the container 10 spaced above the imperforate bottom 25 of the container. Preferably, the tray 80 extends almost completely across the interior of the container 10 and may be manually inserted therein or removed therefrom.

In this embodiment the cooking takes place in the same manner as described in detail with reference to FIGURES 1-3.

During the cooking of the food the steam condensate and the natural juices of the food drain down through the perforations 81 in the tray 80 and are retained in the bottom of the container 10. In this manner the juices drain down away from the food proper and the steam does not have to penetrate through such juices to get to the solid food particles. Also, there is no tendency of the juices to foam up around the solid food particles to impede the complete penetration of the steam down through the food. Thus, in effect, in this embodiment of the invention, the bottom of the container constitutes a trap for receiving the juices and condensate and for holding such liquid away from the solid food particles, so that the latter may be cooked more rapidly and effectively by the steam. With this arrangement there is no danger that the upper layers of the food will be over-cooked by the time that the lower layers become fully cooked.

While the perforated tray shown in FIGURE 4 is the prefered arrangement for enabling the juices and condensate to drain down away from the food proper and to be retained out of contact with the food proper, various other expendients may be resorted to achieve this result without departing from the spirit and scope of this invention. This also holds true for many of the other specific structural details of the illustrated apparatus.

Therefore, it is to be understood that, while there have been described in detail herein and illustrated in the accompanying drawing particular presently-preferred embodiments of this invention, various modifications, omissions and refinements which depart from the disclosed embodiment may be adopted without departing from the spirit and scope of this invention.

This application is a continuation-in-part of my co-pending application Serial No. 677,432, filed August 12, 1957.

Having thus described by invention, I claim:

1. A steam cooker for thawing and cooking previously frozen foods, comprising in combination: a pressure vessel, a container disposed in said pressure vessel and having an open top and an imperforate bottom, a steam conduit extending over said container and having nozzles for projecting steam under pressure and free from entrained moisture directly down into said container, a discharge line leading from said pressure vessel, and a food-supporting tray positioned in said container above the container bottom and having perforations therein which permit the juices of said foods being cooked to drain down into said container bottom.

2. A high speed cooking apparatus adapted for thawing and cooking previously frozen foods, comprising in combination: a pressure vessel having a pressure sealing access door, a tray-like means located adjacent the lower part of said vessel for supporting said frozen foods, a steam conduit extending over said tray-like means and having nozzles for projecting steam under pressure directly down onto the surface of said frozen foods, means connected to said conduit and closely adjacent said vessel for removing entrained moisture from said steam, and means responsive to the thawing of said foods for pressure sealing said vessel.

3. The apparatus as defined in claim 2 wherein said tray-like means includes a foraminate partition for supporting said foods and a juice trap below said partition.

4. A high speed cooking apparatus adapted for thawing and cooking frozen foods, comprising in combination: a pressure vessel having a vent, a tray-like means located in said vessel for supporting said frozen foods, a conduit means for filling said vessel with steam, a first valve for opening and closing said conduit means, a second valve for opening and closing said vent, a time responsive control means having a set timing cycle, a pressure responsive control means, said pressure responsive means connected to said second valve and time responsive control to close said second valve and start said timing cycle when the pressure in said vessel exceeds a predetermined level, and said time responsive control means connected to said first and second valves to close said first valve and open said second valve on the completion of said timing cycle.

5. A high speed cooking apparatus adapted for thawing and cooking previously frozen foods, comprising in combination: a pressure vessel having a pressure sealing door, means for supporting foods to be cooked in said vessel, means for supplying steam under pressure at a predetermined rate to said vessel for heating food in said supporting means, means for allowing steam and air to be exhausted from said vessel and forming an orifice having an area in relation to the predetermined rate of steam supply which the pressure in the interior of said vessel will not appreciably increase until the steam condensation brought on by the presence of the foods at a temperature below the steam temperature ceases and pressure sensitive means communicated with said vessel and operable upon an increase in pressure in said vessel to close said exhaust means.

6. Combination as defined in claim 5 including timing means for closing said steam supply means and opening said steam exhaust means after a preset time.

7. The combination as defined in claim 6 wherein said pressure sensitive means includes means for energizing said timer means simultaneously with the closing of said exhaust means.

8. An automatic speed cooking apparatus adapted for thawing and cooking frozen foods, comprising in combination: a pressure vessel having a pressure sealing access door, steam valve means for controlling a flow of steam under pressure into said vessel, an exhaust valve means for controlling the exhaust of said steam from said vessel, pressure sensitive switch means actuated by a predetermined pressure in said vessel, timer operated switch means operable at predeterminable times, said pressure sensitive switch means being arranged to close said exhaust valve means when the pressure in said vesssel reaches said predetermined value, said timer operated switch means being operable during the predetermined time period to hold said steam supply valve open, and, at the end of said time period, to close said steam supply valve and open said steam exhaust valve.

9. The combination as defined in claim 8 wherein said pressure sensitive switch means are arranged to start at a predeterminable time when the pressure in said pressure vessel reaches said predetermined value.

10. Pressure cooking apparatus adapted for thawing and cooking previously frozen foods, comprising in combination: a pressure vessel having a pressure sealing door, means for supporting frozen food to be thawed and cooked in said vessel, exhaust line communicating with said vessel, an electrically operated valve in said exhaust line, a steam supply pipe communicating with said vessel, an electrically operated valve in said supply line, a first electrical switch having first and second switching positions, pressure sensitive means communicating with said vessel and operably associated with said first switch for shifting said first switch from said first position when no pressure is in said vessel to said second position when pressure is in said vessel above a predetermined amount, a second switch having first and second positions, timer means operable to hold said second switch in said second position for a predetermined time period and then shift from said second to said first position, said first and second switches in said position each being operable to open said exhaust valve, said second switch in said second position being operable to open said steam supply valve, means for shifting said second switch to said second position whereby to allow steam to enter said vessel, said pressure sensitive means inoperable when the pressure in said vessel reaches a predetermined amount to shift said first switch from said first to said second position and close said exhaust valve, said timer means subsequently shifting said second switch from said second to said first position to close said steam supply valve and open said exhaust valve.

11. The combination as defined in claim 10 wherein said timer means is electrically actuated and said first switch in said second position electrically energizes said timer means to commence a time period.

12. A high speed cooker for frozen vegetables and the like comprising in combination: a pressure vessel having a pressure sealing door means in said vessel for supporting said vegetables therein, a steam ejector pipe adjacent an upper part of such vessel and extending the length thereof having a plurality of downwardly facing steam ejector passages for directing steam downwardly onto said vegetables, means for supplying steam to such pipe comprising a steam source and a valve and a condensate trap between such steam source and said steam pipe, said steam trap being arranged to remove any steam source condensate when said valve is first opened.

13. High speed cooking apparatus adapted for thawing and cooking frozen foods, comprising in combination: a pressure vessel having a pressure sealing door, means for supporting said foods to be cooked in such vessel, an exhaust line connected with a lower part of such vessel, an exhaust valve in such line, a steam ejector pipe extending the length of such vessel adjacent an upper surface thereof and having a plurality of downward facing steam ejector jets adapted to direct steam directly down onto a surface of frozen foods in said vessel, and means for supplying steam free from entrained moisture under pressure to said steam pipe, including a steam valve and a condensate trap, said condensate trap having a closed chamber and means for feeding steam into such trap and means for removing steam from such trap adjacent an upper end of said chamber, and means for controlling the operation of said valves to close said exhaust valve when said frozen foods have thawed and to open said valve when said foods have been cooked.

References Cited in the file of this patent

UNITED STATES PATENTS

| | | |
|---|---|---|
| 1,677,912 | Bartleson | July 24, 1928 |
| 1,702,854 | Simonds | Feb. 19, 1929 |
| 2,339,974 | Austin | Jan. 25, 1944 |
| 2,368,141 | Johnson | Jan. 30, 1945 |
| 2,515,137 | Schall et al. | July 11, 1950 |